United States Patent
Gold

[15] 3,707,116
[45] Dec. 26, 1972

[54] FILM CARTRIDGE FOR PHOTOGRAPHIC CAMERAS AND METHOD OF ASSEMBLY

[72] Inventor: Nicholas Gold, Arlington, Mass.
[73] Assignee: Polaroid Corporation, Cambridge, Mass.
[22] Filed: April 21, 1971
[21] Appl. No.: 136,030

[52] U.S. Cl..........................................95/19, 96/76
[51] Int. Cl................................................G03b 19/10
[58] Field of Search..............................95/13, 19–30; 96/76

[56] References Cited
UNITED STATES PATENTS

| | | | |
|---|---|---|---|
| 3,543,662 | 12/1970 | Erlichman | 95/19 X |
| 3,561,339 | 2/1971 | Erlichman | 95/19 X |
| 3,607,283 | 9/1971 | Gold | 95/19 X |

Primary Examiner—Samuel S. Matthews
Assistant Examiner—Richard M. Sheer
Attorney—Brown & Mikulka, Alfred E. Corrigan and Lawrence G. Norris

[57] ABSTRACT

A film cartridge intended for use in certain photographic cameras of the "self-developing" type comprises a relatively flat, box-like casing containing in stacked relationship a spring platen, a stack of film units and a dark slide having an opaque curtain at one end which is folded down over an end of the stack of film units.

The casing has an end wall which is welded during assembly on an open end of the casing body after insertion of the casing contents. The end wall has a pair of projections adjacent the side edges thereof for displacing the side margins of the dark slide curtain away from the end wall joint to preclude attachment of the curtain to the casing during the welding operation.

7 Claims, 3 Drawing Figures

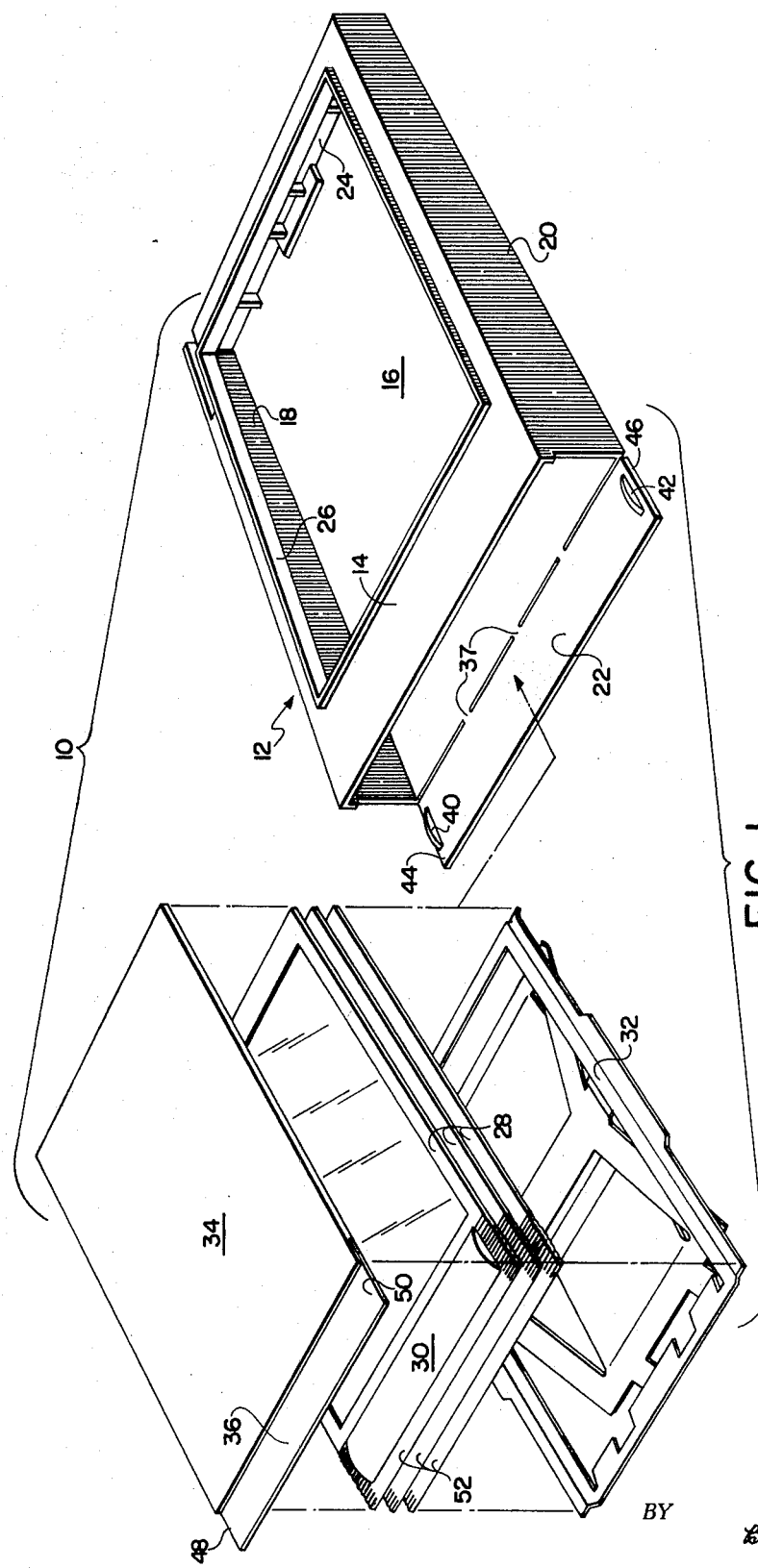

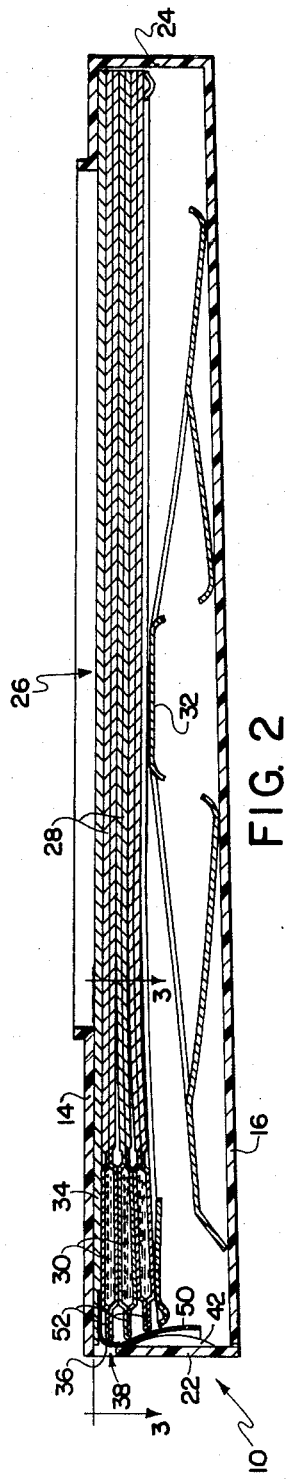
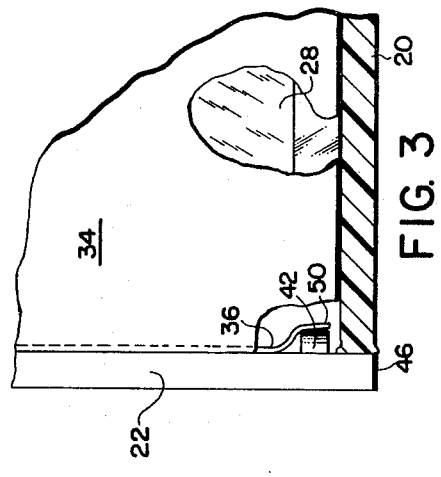

FILM CARTRIDGE FOR PHOTOGRAPHIC CAMERAS AND METHOD OF ASSEMBLY

BACKGROUND OF THE INVENTION

This invention concerns film cartridges which comprise a casing containing in stacked relationship a spring platen, a number of film units and a dark slide for precluding fogging of the film.

The dark slide may comprise a stiff card having a flexible curtain attached on one end. The cartridge is preferably assembled by stacking the cartridge contents in an alignment fixture, compressing the assembly of contents and inserting the assemblage into an open end of the body of the cartridge casing. An end wall is then secured (e.g., by ultrasonic welding) over the open end of the casing body as the dark slide curtain is folded down to cover the exposed end of the stack of film units.

It has been found that in a significant number of assembly operations, the dark slide curtain happens to become attached to the casing. For example, the curtain is sometimes captured by the end wall against the casing body as the end wall is brought into place. The curtain is also apt to be bonded to the wall joint weld as a result of the heat generated during the welding operation.

Any such attachment of the dark slide curtain to the casing renders the involved film cartridge totally inoperative since it is impossible to remove the dark slide in preparation for an exposure of the film units situated beneath the dark slide. Any film cartridge which suffers such a defect during assembly is, of course, of no commercial value and is subject to rejection if detected.

OBJECTS OF THE INVENTION

It is an object of this invention to provide method and means for minimizing the above-described film cartridge defects produced during assembly by attachment of the dark slide curtain to the cartridge casing.

It is a consequent object to reduce the rejection rate of such film cartridges, and thus to effect savings in the per unit cartridge assembly cost.

It is still another object to ease the manufacturing tolerances on the dark slide curtain and to simplify, in general, cartridge assembly procedures, thereby affecting further reductions in the manufacturing cost of such film cartridges.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is an exploded perspective view showing a photographic film cartridge embodying this invention;

FIG. 2 is a sectional view showing the FIG. 1 cartridge assembled; and

FIG. 3 is an enlarged fragmentary sectional view representing a cut-away taken generally along lines 3—3 in FIG. 2, broken away to reveal otherwise hidden components.

DESCRIPTION OF THE PREFERRED EMBODIMENTS

FIGS. 1–3 depict a preferred one of the many possible implementations of the principles of this invention. In the illustrated embodiment, a film cartridge 10 is illustrated as having a casing 12 (of injection molded plastic, for example) having a top wall 14, a bottom wall 16, side walls 18, 20, and end walls 22, 24. End wall 22 will be discussed in detail below in connection with a description of the present invention. The casing 10 is tapered convergently in the direction of cartridge insertion in order to accommodate asymmetries in the contents of the cartridge, and in order to prevent insertion of the wrong end of the cartridge into a camera.

The top wall 14, which may be considered the forward wall of the cartridge relative to the direction of impingement of image-carrying light, defines an exposure window 26 through which scene images are formed on photosensitive materials contained within the cartridge.

The contents of the cartridge 10 include a stack of film units 28, here shown as being of the "self-developing" type having a pod 30 containing processing fluid which is caused to be spread between photosensitive and receiving layers to effect development of a latent image formed on the photosensitive layer.

A spring platen 32 resting on the bottom wall 16 of the casing 12 acts to urge the film units 28 in succession into a proper attitude for exposure beneath the window 26. A dark slide 34 having a depending curtain 36 on one end thereof acts to prevent fogging of the film units 28 prior to use of the cartridge 10. The dark slide 34 will be described in more detail below.

The body of the casing 12 and the end wall 22 are preferably injection molded as a unitary structure with the end wall 22 connected to the casing body by an integral hinge 37. As explained above, the cartridge 10 is assembled by forming in a preliminary operation a stack of the cartridge contents (including the spring platen 32, a plurality of film units 28, and the dark slide 34), preferably in a collating or alignment fixture. The stack of contents is then compressed and inserted into the open end of the casing 12 (as shown in FIG. 1) with the dark slide curtain 36 extending from the trailing end of the inserted stack of contents. During the loading operation, the curtain 36 is caused to be folded down over the ends of the film units 28 to shield the film units 28 from light entering the casing 12 through the withdrawal slit 38. After insertion of the contents, the end wall 22 is pivoted up and secured permanently to the casing body, for example, by the use of an ultrasonic welding operation.

A slit 38 formed between the upper edge of the end wall 22 and the top wall 14 of the casing permits withdrawal of film units from the cartridge.

As discussed briefly above, during assembly of the film cartridge, the curtain 36 on the dark slide 34 is apt to become attached to the casing 12 as the end wall 22 is secured on the open end of the casing body. Such attachment of the curtain was found to result from direct capture of the curtain 36 between end wall 22 and the body of the casing 12, or on other occasions by adherence of the curtain 36 to the weld joint or to molten flashing formed at the joint due to the thermal energy created in the joint regions during the welding process.

The described curtain attachment problem has been substantially overcome by the provision, according to this invention, of a pair of projections 40, 42 which are disposed on the inner surface of the end wall 22 adjacent the side edges 44, 46 thereof and which extend into the casing enclosure. The projections 40, 42 function during the end wall assembly operation to displace the side margins 48, 50 of the dark slide curtain 36 back away from the end wall 22 as the end wall is being secured to the body of the casing 12. By this expedient, the curtain side margins 48, 50 are held away from the joints and from the hot melt formed in the vicinity thereof to preclude attachment of the curtain 36 to the casing 12 (see FIG. 3).

The projections 40, 42 are preferably each spaced from the respective side edges 44, 46 of the end wall 22 a distance greater than the sum of the thickness of a casing side wall (18, 20) and the thickness of the curtain 36, such that when the end wall 22 is secured to the body of the casing 12, the projections 40, 42 are each spaced from the respective casing side walls 18, 20 a distance sufficient to preclude frictional capture of the side margins 48, 50 of the curtain 36 between the projections 40, 42 and the associated casing side walls 18, 20 (see FIG. 3).

Note that due to the thickness of the stacked pods 30, the film units 28 assume a progressively more curved cross-sectional configuration toward the bottom of the stack. The effect of this greater curvature of the lowermost film units 28 is to create an unoccupied, generally wedge-shaped space between the end wall 22 and the leading ends 52 of the film unit 28. In accordance with this invention, the projections 40, 42 are caused to have a generally arcuate profile designed to extend into and occupy a part of this unused space created by the described stacking of the film units 28. Thus, the primary object of this invention, i.e., to preclude attachment of the curtain 36 to the cartridge casing 12 during assembly, is achieved without requiring the provision of any additional space within the cartridge interior. It is manifest that the cost of the projections 40, 42 (the additional material required) is nominal. Added tooling cost to provide for the projections is insignificant.

The provision of the projections 40, 42 in accordance with this invention results in a significant reduction in the per unit cost of assembling the described film cartridges. Among the factors contributing to this cost reduction are: (1) the rejection rate of defective cartridges is drastically reduced; (2) cartridge assembly procedures are simplified; (3) the manufacturing tolerances on the dark slide 34 are reduced; and (4) any skewing of the curtain 36 is compensated for.

The invention is not limited to the particular details of construction of the embodiments depicted, and it is contemplated that various and other modifications and applications will occur to those skilled in the art.

For example, the construction (including the profile) of the projections 40, 42 may be altered consonant with the function intended to be performed, thereby in accordance with this invention. In applications wherein the construction or arrangement of the dark slide or the end wall might be different, or wherein a different method of assembly is employed, the construction and/or placement of the projections may be altered pursuant to the teachings of this invention.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A casing for a film cartridge for storing in stacked relationship a stack of film units and a dark slide having on an end thereof a curtain for covering an end of the stack of film units, said casing comprising:
   a relatively flat, box-like body having spaced top and bottom walls, a pair of opposed side walls, and one end wall;
   a second end wall for closing at least a part of the open end of said body after said body has been loaded with said stack of film units and said dark slide, said second end wall including projection means disposed on the inner surface and adjacent at least one edge thereof and extending into the casing enclosure for displacing at least one margin of said dark slide curtain away from said second end wall as said second end wall is being secured to said body of said casing to preclude attachment of said one margin of said curtain to said casing.

2. The casing defined by claim 1 wherein said projection means comprises a pair of projections, one adjacent each side edge of said second end wall, spaced from the respective side edges of said second end wall a distance greater than the sum of the thickness of the casing side wall and the thickness of said curtain, such that when said second end wall is secured to said body of said casing, said projections are each spaced from the associated casing side wall a distance sufficient to preclude capture of said curtain between said projections and the associated casing side walls.

3. The casing defined by claim 1 wherein said projections have a generally arcuate profile.

4. A film cartridge, comprising:
   a relatively flat, box-like casing having spaced top and bottom walls, a pair of opposed side walls, and one end wall;
   spring platen means disposed in said casing and supported by said bottom wall thereof;
   a stack of film units on said spring platen means;
   a dark slide on said stack of film units, said dark slide having on an end thereof a curtain for covering an end of said stack of film units adjacent an open end of said casing; and
   a second end wall for closing at least a part of said open end of said casing after said casing has been loaded with said stack of film units, said spring platen means and said dark slide, said second end wall including projection means disposed on the inner surface and adjacent at least one edge thereof and extending into the casing enclosure for displacing at least one margin of said dark slide curtain away from said second end wall as said second end wall is secured to said body of said casing to preclude attachment of said one margin of said curtain to said casing.

5. The film cartridge defined by claim 4 wherein said projection means comprises a pair of projections, one adjacent each side edge of said second end wall, spaced from the respective side edges of said second end wall a distance greater than the sum of the thickness of the casing side wall and the thickness of said curtain, such that when said second end wall is secured to said body of said casing, said projections are each spaced from the associated casing side wall a distance sufficient to preclude capture of said curtain between said projections and the associated casing side walls.

6. The film cartridge defined by claim 5 wherein said projections have a profile accommodating a space formed between said end of said stack of film units and said second end wall.

7. The film cartridge defined by claim 6 wherein said profile is generally arcuate.

* * * * *